Sept. 14, 1937.	R. A. MASTEN	2,092,809
STIFFNESS TESTER
Filed March 23, 1933
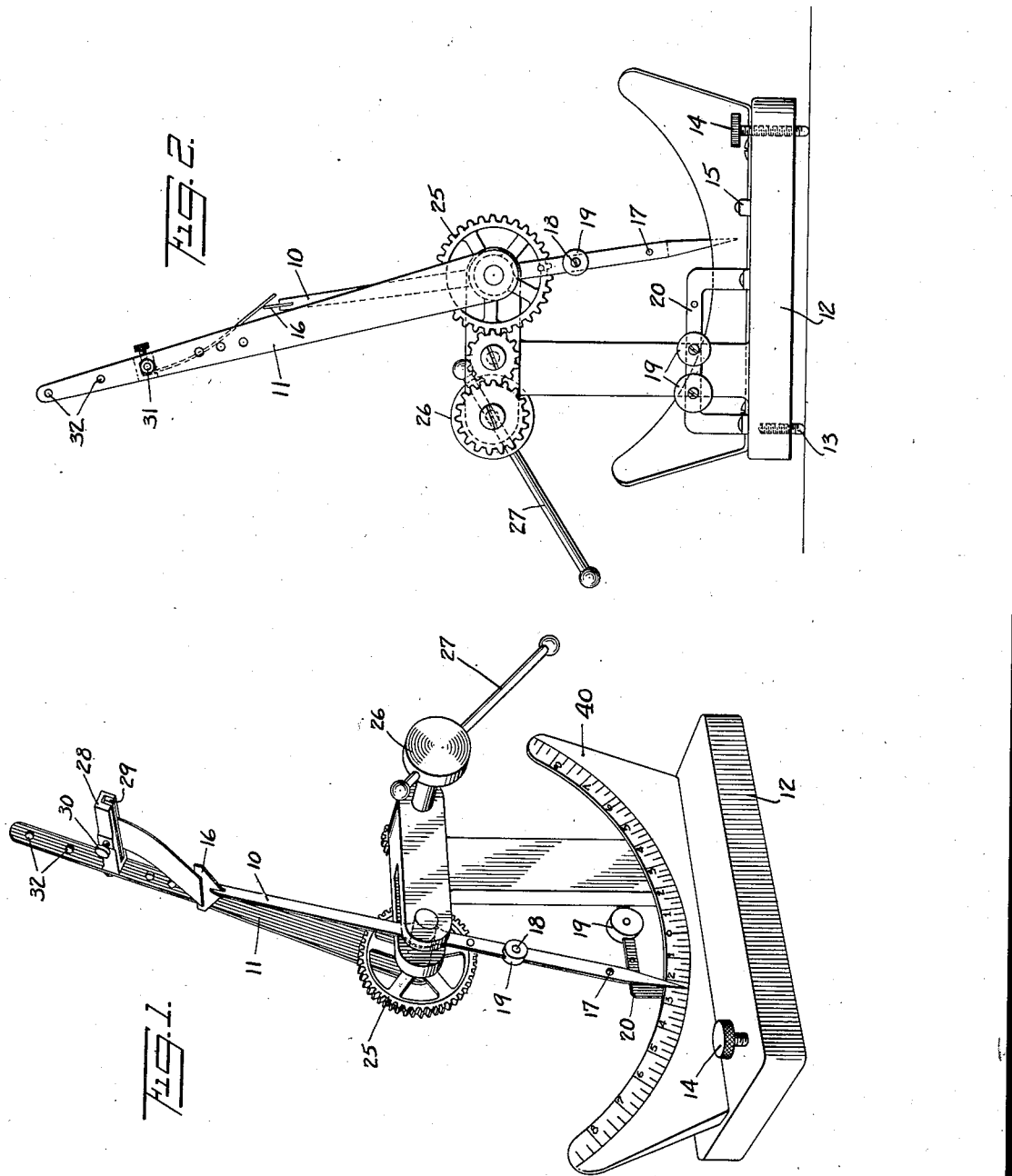
INVENTOR
Ralph A. Masten
BY
Frank Toohey Jr.
ATTORNEY Patented Sept. 14, 1937

2,092,809

UNITED STATES PATENT OFFICE 2,092,809

STIFFNESS TESTER

Ralph A. Masten, South Glens Falls, N. Y., assignor to International Paper Company, New York, N. Y., a corporation of New York Application March 23, 1933, Serial No. 662,195

3 Claims. (Cl. 265—17)

My present invention relates to a method and apparatus for measuring a physical characteristic of paper or other material such as cloth and celluloid, designated as the stiffness of the material.

The stiffness of a material is the ability of the material to resist deformation under stress. The modulus of elasticity is the criterion of stiffness. Based on this definition of stiffness, some mechanical means of measuring the deflection of a strip of paper at a definite load or the load at a definite deflection may be used for determining the stiffness of the material. An instrument utilizing the principle of a cantilever beam with the load applied near its free end may be used for determining the deflection of a material at a known load or the load at a known deflection.

The idea of stiffness is familiar to the paper trade. Heretofore, no means of determining and expressing this physical characteristic has been possible in a concrete manner. The instrument designed in accordance with my invention makes possible a concrete conception of the stiffness property of a sheet of paper, paper board, cloth, or other material in known terms such as grams or pounds, which is of great value for indicating the suitability of the particular grade tested for the designated use of the material.

Those familiar with the art of paper making have recognized in a general way that they have had no definite means of expressing the factors relative to the stiffness of a sheet which my invention now makes possible to accurately measure and definitely express. Such general terms as "soft", "hard", "stiff", and "flexible" have been used to express the character of the material. The importance of these different factors relating to the product has also been recognized without being able to assign a definite measure to them. My instrument gives a definite measure of the character of the material being tested. This measure is readily ascertainable without any complicated operations.

In the manufacture of the material, suitable regulation of the raw material to attain the desired stiffness has been difficult. By testing the product with my stiffness instrument, better regulation can be maintained.

In the manufacture of paper the stiffness of the sheet is controlled by many factors such as beating, loading and calendering. My instrument can be used to indicate the effect of the different operations on the stiffness of the paper as well as the effect of adding different materials to the paper to produce a higher or lower degree of stiffness. Similarly, this instrument can be used also to measure the stiffness of cloth, celluloid and similar materials, as well as that of these same materials after having been treated or filled with different agents.

One form of mechanism whereby the above objects are attained is illustrated in the accompanying drawing, wherein like numerals refer to the same parts throughout. The several views, taken in connection with the following specification, illustrate the preferred form, but it is to be understood that the construction and arrangement of parts may be varied without departing from the spirit of my invention.

In the drawing:

Fig. 1 is a front view in perspective of my invention, and

Fig. 2 is a rear elevation thereof.

The form of the invention illustrated comprises two arms 10 and 11 mounted on a base 12. The base is preferably a block of suitable, heavy material and is supported on three legs, two of which are capable of adjustment to bring the base to a level. Thus leg 13 is fixed, while legs 14 are adjusted by manipulation of their knurled heads. A spirit level 15 enables accurate leveling of the base in the direction of the pivotal mounting of arm 10. An approximation of the horizontal suffices in the opposite direction, as will presently appear, but if desired a second spirit level may be mounted on the base normal to level 15.

Arm 10 is pivotally mounted on jeweled bearings, thus minimizing any errors due to friction. This arm is preferably in static balance when no weights are placed on it. The upper end of arm 10 is provided with a wider portion or plate 16, parallel to the axis of the pivot. The opposite end of arm 10 is provided with holes 17 adapted to receive a screw 18 maintaining a standard weight 19 at a known distance from the pivot. The weight is bifurcated and straddles arm 10, screw 18 supporting it so that the point of application of its mass will be in a straight line through plate 16, pivot and jewel bearings and the tip of arm 10 which constitutes a pointer. Other standard weights may be carried on a rack 20 attached to the base. It is obvious that a wide range of selectivity is provided by changing the weights, or the point of application of the same weight.

Arm 11 is fixed to the hub of a gear 25, the axes of rotation of arms 10 and 11 being practically coincident. Gear 25 is driven through a chain of gears by manual manipulation of knob 26 and rod 27. The end of arm 11 extends upwardly beyond the upper end of arm 10 and carries a clamp adapted to hold the test piece. The clamp is of suitable construction to hold one end of a test piece throughout its width, and as shown consists of a channel bar 28 having a clamping bar 29 mounted therein. A screw 30 extends through one wall of the channel and upon manipulation thereof forces the clamping bar and sample piece against the opposite wall of the channel. A screw 31 extends through a suitable hole 32 in arm 11 and supports the clamp substantially normal to arm 11 and parallel to plate 16. A series of holes 32 are provided so that various lengths of test pieces may be used, tissue paper giving better results in very short lengths, while stiffer materials require longer lengths. The length of test piece is always taken such that in whatever position the clamp may be, the test piece when held therein overlaps plate 16 by some standard length such as a quarter of an inch.

Arm 10 is free to swing in both directions past the vertical and arm 11 is rotatable in both directions. Any suitable form of scale may be employed, and, in the embodiment shown, the scale 40 is graduated on both sides of a center point in terms of the sines of the angles included between the vertical and the arm 10 in its various positions. The scale may therefore be designated as a double-sine scale. The scale itself is mounted on the base in such a position that the pointer on the arm 11 swings past the graduations thereon.

In the operation of the device it is first leveled and arm 10 brought to read zero on scale 40. A test sample is prepared, its dimensions being standard for the particular type of material. The width of the sample may vary from one half inch to two inches, and the length from one inch to four and a half. In cutting the sample care should be taken to avoid a feathered edge as inaccuracies are certain to result therefrom. The sample is clamped on arm 11, clamp 28 being moved to the proper position to accommodate the length of sample in use. A weight 19 is attached to arm 10 at the proper position. A suitable standard size of sample, value of loading weight and length of weight arm is selected for each class of material being tested.

A slow rotation of knob 26 and rod 27 will cause the sample piece to strike plate 16 and thus place a load on the free end of the sample as arm 10 is moved from the vertical. The load gradually increases as the angle of deflection of the pointer arm increases, reaching a maximum as the sample end clears or is about to clear the edge of plate 16. At this point the reading on scale 40 is taken. Arm 11 is now reversed and the deflection in the opposite direction is taken, thus eliminating such errors as would be due to any tendency of the sample to curl, or any error due to a slight deviation from the horizontal of the leveling of base 12 in the direction of swing of the pointer arm. The average results of a number of tests on a number of samples best determine the stiffness of the material.

Results are expressed as the milligrams load applied in this manner on a standard size sample one inch wide by three and a half inches long. Suitable tables are used for converting to load in milligrams from average scale readings obtained on any size sample with any loading weight. In this manner, all grades of paper and other fabrics are comparable on the same basis expressed in a standard unit.

Tests on paper should be made in both directions of the web. It is universally true that the stiffness is greater in the "machine direction", that is, in the direction of formation of the web, than in the "cross direction", or across the width of the web. This is a factor of great importance and should not be overlooked, so that for each type of paper two values of milligram-stiffness are to be ascertained.

In the claims appended hereto, reference to arm 11 may be made by the term "sample holder"; and reference to arm 10 may be made by the term "pointer arm".

It is obvious from the foregoing that I have devised a simple means for testing the stiffness of paper or fabrics and reducing the values obtained thereby to a common terminology and a standard unit system.

Various changes in construction or arrangement may be resorted to without altering the scope of my invention, the extent of which is determined by the following claims which are to be broadly construed.

What I claim is:

1. Apparatus for measuring the stiffness of paper comprising in combination, a rotatably mounted arm, means to clamp one end of a sample piece of predetermined length on said arm, a freely movable, pendulous pointer arm pivoted coaxially of said rotatable arm and having one end so positioned as to contact with the opposite and free end of said sample piece, means to rotate said first named arm to move the free end of said sample piece against the end of said pointer arm and into contact therewith, thereby causing deflection of said pointer arm until deflection of said sample piece causes it to slip off of the end of said pointer arm, and means to measure the maximum deflection of said pointer arm by said sample piece.

2. Apparatus for measuring the stiffness of paper comprising in combination, a rotatably mounted arm, means to clamp one end of a sample piece of predetermined length on said arm, a freely movable, pendulous pointer arm pivoted coaxially of said rotatable arm and having one end so positioned as to contact with the opposite and free end of said sample piece, means to rotate said first named arm to move the free end of said sample piece against the end of said pointer arm and into contact therewith, thereby causing deflection of said pointer arm until deflection of said sample piece causes it to slip off of the end of said pointer arm, and means to measure the maximum deflection of said pointer arm by said sample piece, said measuring means comprising a double sine scale whereby to measure the deflection of said pointer arm when said sample piece is moved in the reverse direction.

3. Apparatus for measuring the stiffness of paper comprising in combination, a support, a pendulous member carried by said support, a member pivoted on said support coaxially of said pendulous member, a paper clamp carried by one of said members and a paper contacting element carried by the other of said members, a scale on said support, a pointer carried by one of said members and movable over said scale, the distance between one edge of said element and the adjacent edge of said clamp being proportioned to the unclamped length of a standard length paper test specimen so as to limit the relative movement between said members to a definite amount and which will be terminated when the unclamped end of said specimen snaps off of the contacting element.

RALPH A. MASTEN.